United States Patent
Sharif-Ahmadi et al.

(10) Patent No.: US 10,958,864 B2
(45) Date of Patent: Mar. 23, 2021

(54) TRANSCODING SYSTEM AND METHOD

(71) Applicant: MIMIK TECHNOLOGY INC., Richmond (CA)

(72) Inventors: Seyed M. Sharif-Ahmadi, Richmond (CA); Sam Armani, Richmond (CA); Hofa Chiang, Richmond (CA); Jonathan Chao, Richmond (CA)

(73) Assignee: MIMIK TECHNOLOGY INC., Vancouver (CA)

( * ) Notice: Subject to any disclaimer, the term of this patent is extended or adjusted under 35 U.S.C. 154(b) by 0 days.

(21) Appl. No.: 14/389,622

(22) PCT Filed: Mar. 28, 2013

(86) PCT No.: PCT/CA2013/000295
§ 371 (c)(1),
(2) Date: Sep. 30, 2014

(87) PCT Pub. No.: WO2013/142972
PCT Pub. Date: Oct. 3, 2013

(65) Prior Publication Data
US 2015/0058494 A1 Feb. 26, 2015

(30) Foreign Application Priority Data

Mar. 30, 2012 (CA) ............................. CA 2773342
Oct. 3, 2012 (CA) ............................. CA 2791935

(51) Int. Cl.
*H04N 5/445* (2011.01)
*H04N 7/10* (2006.01)
(Continued)

(52) U.S. Cl.
CPC ..... *H04N 5/44591* (2013.01); *G06Q 30/0267* (2013.01); *G08C 17/02* (2013.01);
(Continued)

(58) Field of Classification Search
CPC ............... G06Q 30/0267; G08C 17/02; G08C 2201/40; G08C 2201/30; H04L 65/607;
(Continued)

(56) References Cited

U.S. PATENT DOCUMENTS

2004/0240390 A1* 12/2004 Seckin .................... H04L 47/10
370/252
2009/0067510 A1* 3/2009 Hamilton ......... H04N 21/23608
375/240.26
(Continued)

FOREIGN PATENT DOCUMENTS

WO 2005026866 A2 3/2005
WO 2007073602 A1 7/2007

OTHER PUBLICATIONS

International Search Report and Written Opinion for PCT/CA2013/000295 dated Aug. 9, 2013.

*Primary Examiner* — Normin Abedin
(74) *Attorney, Agent, or Firm* — Maschoff Brennan

(57) ABSTRACT

A method of providing streaming content to a user device is provided, including: providing a gateway having a transcoder, having a single encoder and a single decoder, the transcoder configured to adapt the streaming content to a plurality of bit rates; the user device requesting the content at a bit rate from said gateway; the gateway instructing the transcoder to provide the content at the bit rate; the user device requesting the content at a second bit rate from said gateway; the gateway instructing the transcoder to provide the content at the second bit rate; and the transcoder transcoding the content at the second bit rate.

5 Claims, 5 Drawing Sheets

(51) Int. Cl.
| | |
|---|---|
| H04N 21/258 | (2011.01) |
| H04N 21/426 | (2011.01) |
| G08C 17/02 | (2006.01) |
| H04L 29/06 | (2006.01) |
| G06Q 30/02 | (2012.01) |
| H04N 21/466 | (2011.01) |
| H04W 48/20 | (2009.01) |
| H04W 4/02 | (2018.01) |
| H04N 5/44 | (2011.01) |

(52) U.S. Cl.
CPC ........ *H04L 65/1023* (2013.01); *H04L 65/607* (2013.01); *H04N 7/106* (2013.01); *H04N 21/25891* (2013.01); *H04N 21/42676* (2013.01); *H04N 21/4667* (2013.01); *H04W 48/20* (2013.01); *G08C 2201/30* (2013.01); *G08C 2201/40* (2013.01); *H04N 2005/443* (2013.01); *H04N 2005/4425* (2013.01); *H04W 4/023* (2013.01)

(58) Field of Classification Search
CPC ..... H04N 2005/4425; H04N 2005/443; H04N 21/25891; H04N 21/42676; H04N 21/4667; H04N 5/44591; H04N 7/106; H04W 48/20; H04W 4/023
See application file for complete search history.

(56) References Cited

U.S. PATENT DOCUMENTS

| | | | |
|---|---|---|---|
| 2009/0264103 A1* | 10/2009 | Chen | H04L 29/06027 455/411 |
| 2012/0233644 A1* | 9/2012 | Rao | H04M 1/7253 725/62 |

* cited by examiner

TRANSCODING SYSTEM AND METHOD

TECHNICAL FIELD

The application is directed to transcoders for changing the bit rates of streaming content sent to a user device.

BACKGROUND

Transcoding is used to change the bit rate of streaming content. The present method for providing a plurality of different bit rates for a user device is shown in FIG. 1. As shown in FIG. 1, a content source 10 receives a request from a client 20 for streaming content. Media server 15 determines the appropriate bit rate$_i$, for the streaming content, and requests that bit rate from the corresponding transcoder $t_i$. Each transcoder $t_i$, is configured to provide a particular bit rate, for example transcoder $t_1$ may provide a bit rate of 128 kb/s; transcoder $t_2$ a bit rate of 256 kb/s, and transcoder $t_3$ at 512 kb/s. When a client 20 requests a different bit rate, the appropriate transcoder $t_i$ is instructed to provide the streaming content.

While this system, if enough transcoders $t_i$ are present, is able to provide appropriate bit rates as requested, typically many of the transcoders $t_i$ are not used at any given time, and the computing resources reflected in the unused transcoders $t_i$ are wasted. Also, particular transcoders may be used much more than others resulting in inefficient allocation of resources.

Related prior art includes US 2002/0152317; U.S. Pat. No. 7,586,868; US 2006/0126742; US 2011/0265134; US 2002/0152317; and US 2010/0094931.

US Patent Application Publication No. 2002/0152317 discloses a multi-rate transcoder for digital streams. FIG. 2 shows a block diagram of such a transcoder, in which a single transcoder $t_1$ includes a single decoder $d_1$ and a number of encoders $e_i$, each of the encoders $e_i$ configured to provide a particular bit rate$_i$.

Accordingly, there exists a need for a method and system that improves on the deficiencies of the prior art.

SUMMARY OF THE INVENTION

In the system according to the invention, a media server uses a single transcoder to provide multi-bit rate adaptive streaming for a single client representing a single user device, as opposed to a separate transcoder for each bit rate that is provided to a client.

The media server uses a transcoder to convert content from one format to another. The transcoder provides both an encoding and decoding process. The transcoder receives the content, decodes the content, and encodes the content again as needed by the user device.

A method of providing streaming content to a user device is provided, including: providing a gateway having a transcoder, having a single encoder and a single decoder, the transcoder configured to adapt the streaming content to a plurality of bit rates; the user device requesting the content at a bit rate from said gateway; the gateway instructing the transcoder to provide the content at the bit rate; the user device requesting the content at a second bit rate from said gateway; the gateway instructing the transcoder to provide the content at the second bit rate; and the transcoder transcoding the content at the second bit rate.

The user device may be registered with the gateway, and the transcoder may be within a media server or streaming server within the gateway. The transcoder may be associated with the user device when the user device is registered with the gateway. The transcoder may provide content only to the registered user device.

A method of transcoding content for a client amongst a plurality of user devices is provided, including: providing a gateway having a plurality of transcoders and in communication with plurality of registered user devices; associating a different transcoder for each of the user devices; on receiving a request for content at a bit rate from one of the user devices; determining the transcoder associated with the requesting user device; adapting the transcoder to transcode to the bit rate; transcoding the content to the bit rate for transmittal to the requesting user device.

A system for providing a plurality of bit rates is provided, including: a gateway having a plurality of transcoders, a plurality of user devices registered to the gateway; wherein on registration of one of the user devices to said gateway, the user devices is associated with one of the transcoders, said not associated with an other user device, the transcoders configured to provide any bit rate requested by the user device. Each of the transcoders may include an associated encoder and decoder pair, each of said encoder and decoder pairs only associated with one of the transcoders. One of the user devices may request content to be delivered to the user device at a bit rate provided by the associated transcoder, and the content from the transcoder may be provided to a second user device not associated with the transcoder.

DETAILED DESCRIPTION

Figure 1:
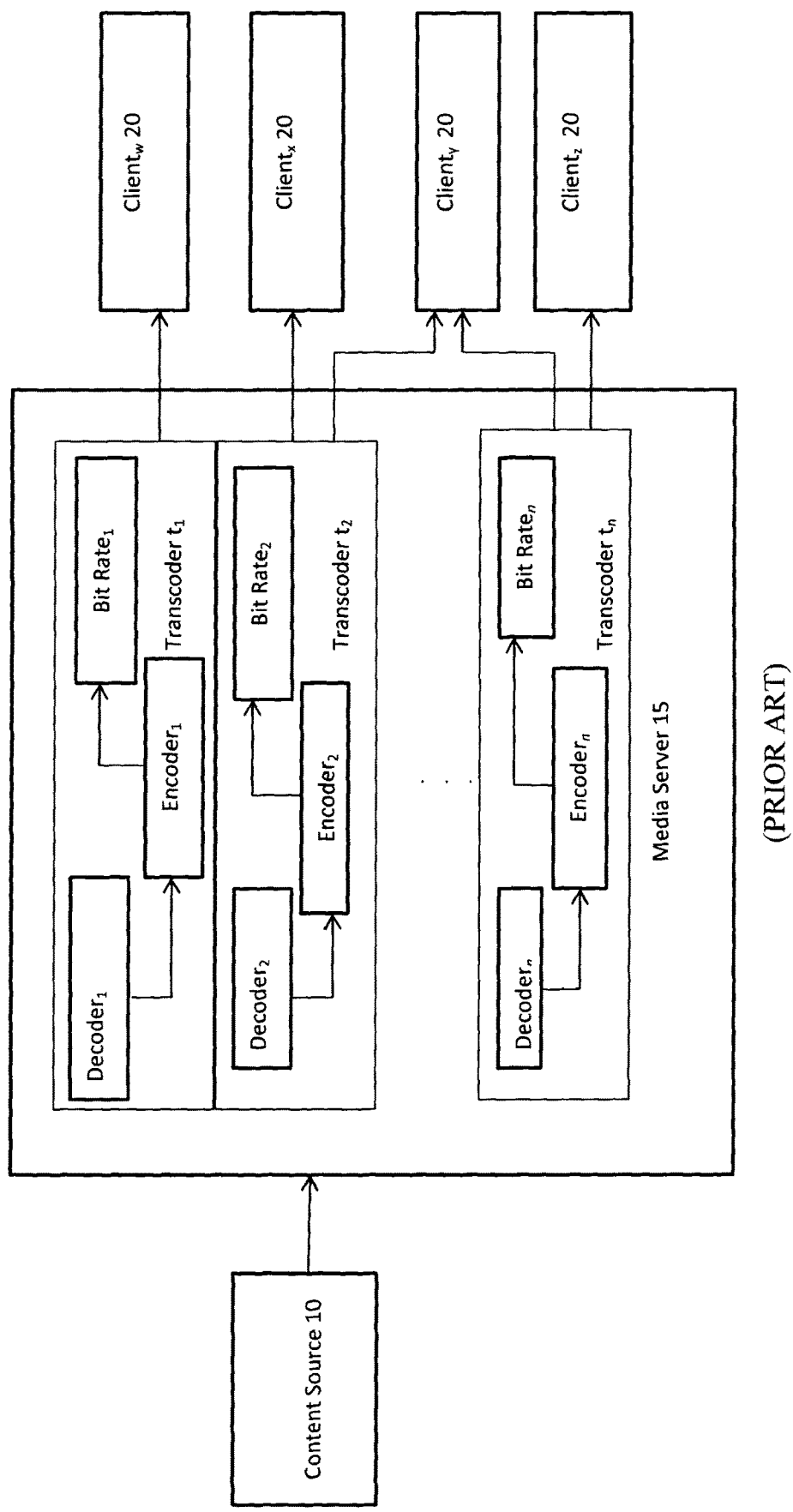
FIG. 1 is a block diagram illustrating a prior art media server using a number of transcoders to code content.
Figure 2:
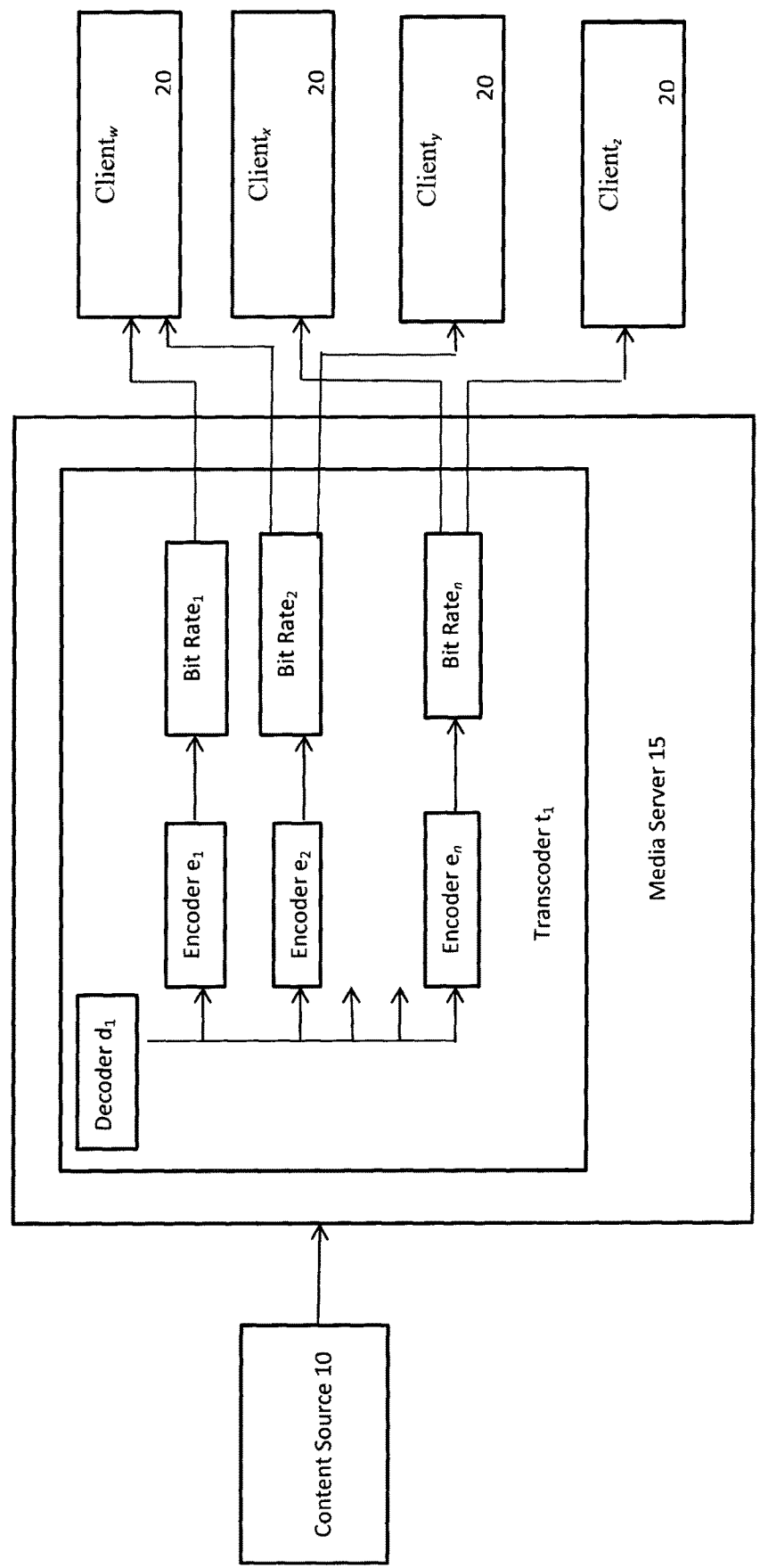
FIG. 2 is a block diagram showing another prior art media server using a single transcoder to code content.
Figure 3:
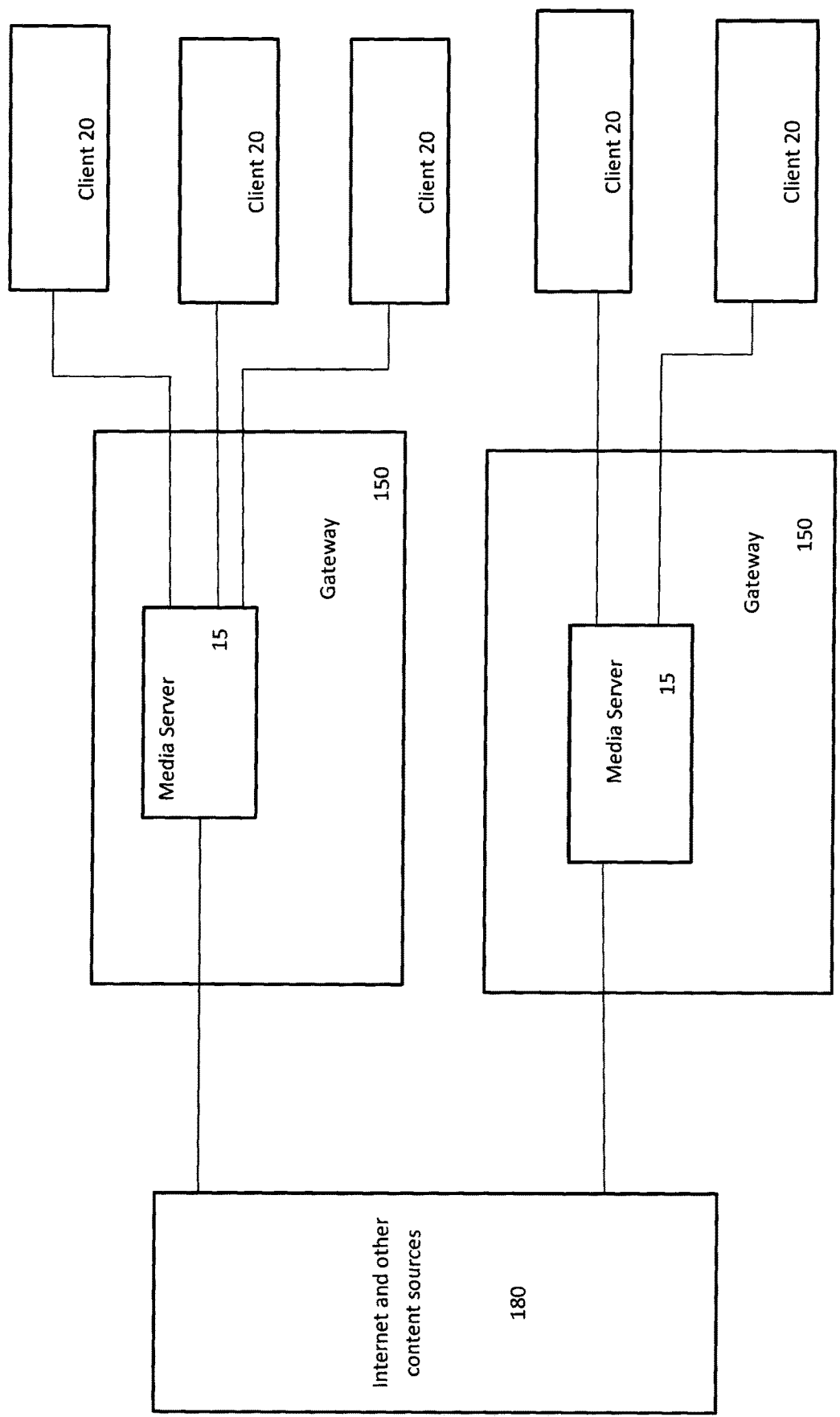
FIG. 3 is a block diagram showing the environment in which the transcoder according to the invention operate.

The system according to the invention is used within a local area network, including gateway 150, with each gateway 150 being a customer premises equipment ("CPE") for servicing a home or other residential unit (such as a dorm room or apartment), as seen in FIG. 3. Each gateway 150 acts as one node within a network, including the Internet and other content sources 180 and is used to forward content to one or more clients 20, that are user devices registered to use that particular gateway 150. The smaller network formed by a single gateway 150 and clients 20 constitute a local area network. Each client 20 is registered with gateway 150, which assigns a particular unique transcoder $t_i$ to serve that client. Gateway 150 thus has a record associated with each client, including information about the specifications of the user device including computing resources and screen capabilities. Client 20 need not be within that local area network to access gateway 150, for example client 20 may be a cell phone in a different location, accessing gateway 150 through a cellular network.

Clients 20 are user devices, which may include computers, set top boxes, smart phones, pads, netbooks, televisions, and game consoles.

Figure 4:
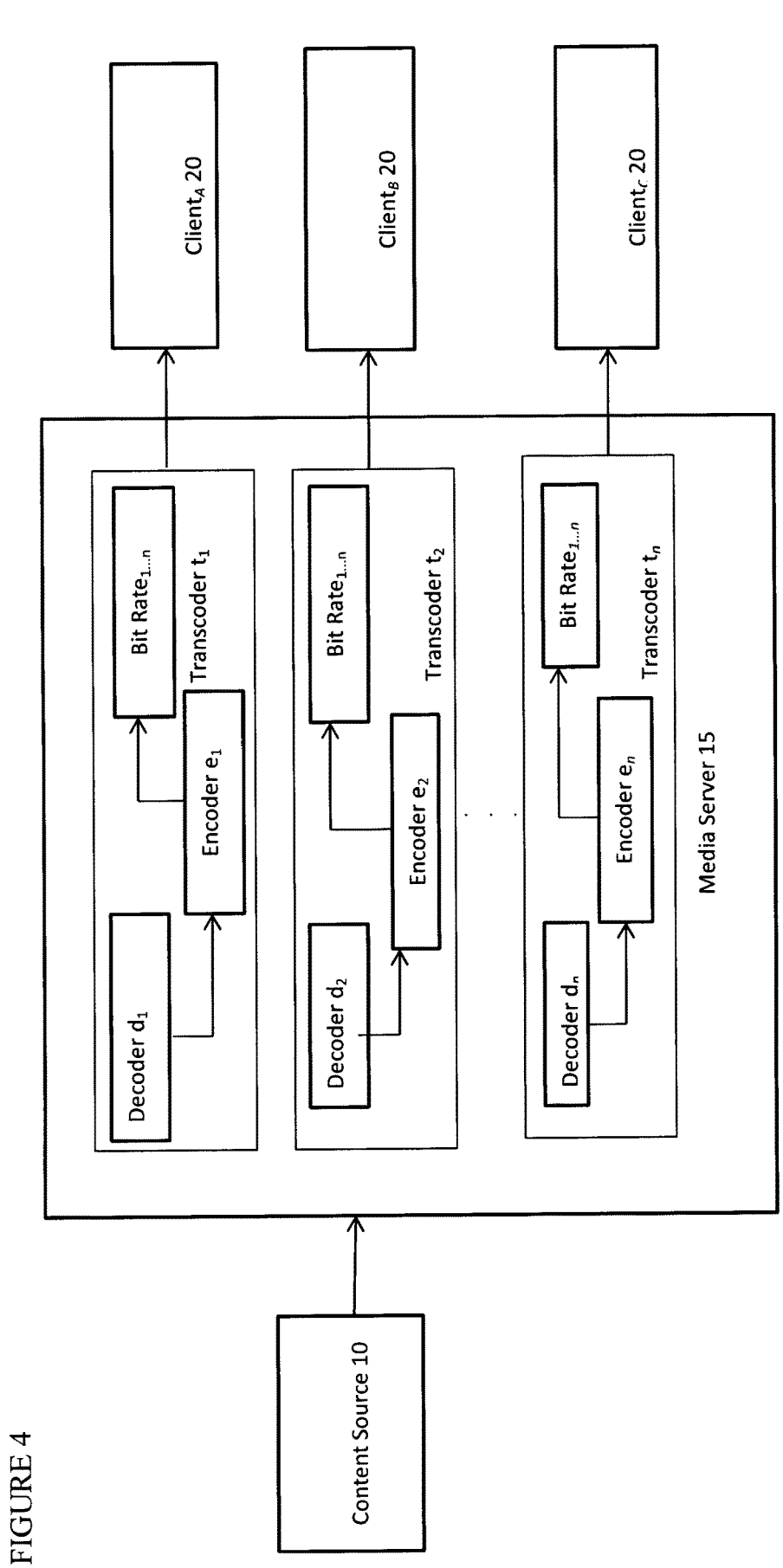
FIG. 4 is a block diagram of the transcoders within a media server according to the invention.

As seen in FIG. 4, media server 15 thus uses a single transcoder $t_i$ to provide multi-bit rate adaptive streaming for a single client 20, as opposed to a separate transcoder for each bit rate that is provided to client 20. Thus, for example transcoder $t_1$ is dedicated to client$_A$, transcoder $t_2$ is dedicated to client$_B$ and transcoder $t_n$ is dedicated to client$_C$. When a new client (i.e. user device) is registered to gateway 150, a new transcoder $t_i$ is dedicated to that new client 20.

Each transcoder $t_i$ has a corresponding dedicated encoder $e_i$ and decoder $d_i$. Each transcoder $t_i$ is able to provide a plurality of bit rates$_{1\ldots n}$ to a client 20.

Figure 5:
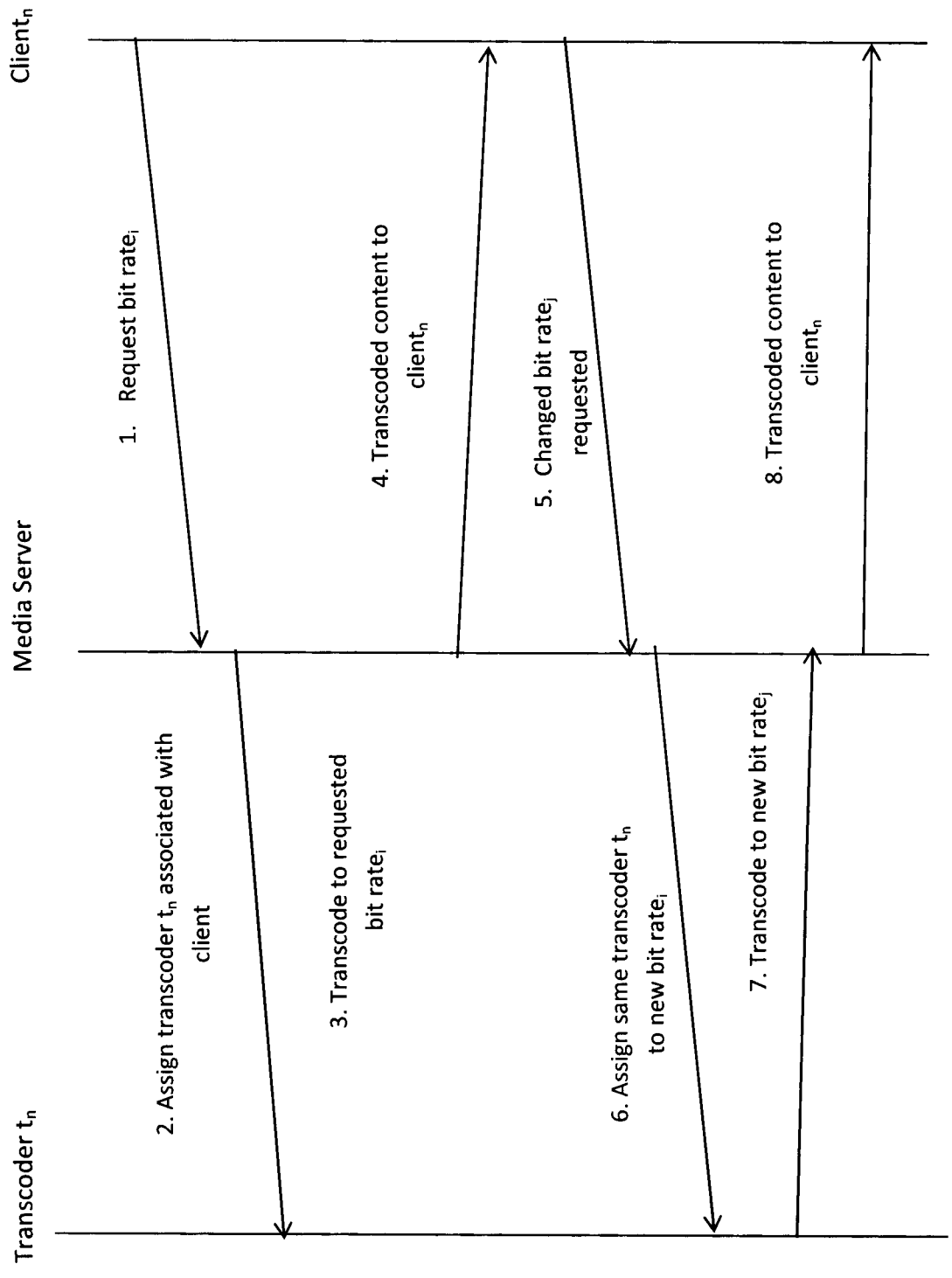
FIG. 5 is a state diagram showing communications between media server, a client, and a transcoder according to the invention.

Media server 15 advertises multiple bit rates to each registered client 20. As shown in FIG. 5, when a client$_n$ 20 requests a particular bit rate$_i$, then the transcoder $t_n$ associated with the client$_n$ 20 begins transcoding at the requested bit rate$_i$. As the client$_n$ 20 requests a different bit rate$_j$ (for example, perhaps due to a change in network conditions), media server 15 accepts the request and seamlessly instructs the same assigned transcoder $t_n$ to change its transcoder parameters to accommodate the new bit rate$_j$ for the client$_n$.

Each transcoder $t_i$ may have its parameters tuned to take into account the client 20's device, for example the device's screen resolution, so as to provide the highest quality of content requested for that client.

Gateway 150 thus scales well with the number of bit rates provided (as only one transcoder is ever required for a single client). This approach does not scale well with the number of client requesting streams (again, as each client requires one transcoder). Thus the system according to the invention works well when the number of clients is small (for example, family sized). However, as the number of expected clients 20 of gateway 150 is relatively low (e.g. those located in a family home), the expected range of bit rates provided will have a larger impact on gateway 150 then the number of users.

In an alternative embodiment of the invention, media server 15 can change or set the bit rate for client 20. Furthermore, in an alternative embodiment of the invention, a single transcoder $t_i$ may service two clients 20, by providing the same content at the same bit rate to both clients 20. Thus is ordinarily done at the behest of one of the clients 20, which requests that gateway 150 provide the same content to a second client 20. In these circumstances, the bit rate used may not be optimal for the second client, and the quality of the content experience subpar for that client.

While particular embodiments have been described in the foregoing, it is to be understood that other embodiments are possible and are intended to be included herein. It will be clear to any person skilled in the art that modification of, and adjustments to, the foregoing embodiments, not shown, are possible.

What is claimed:

1. A method of providing streaming content to a user device, amongst a plurality of user devices, the method comprising:
   providing a gateway having a plurality of transcoders and said plurality of user devices registered to said gateway;
   associating a different transcoder from amongst said plurality of transcoders to each of said plurality of user devices in a record comprising details of computing resources and screen capabilities of said plurality of user devices, wherein a transcoder, of said plurality of transcoders, has a single encoder and a single decoder, and wherein said transcoder is configured to adapt said streaming content to a plurality of bit rates;
   advertising multiple bit rates, of said plurality of bit rates, to said user device registered to said gateway;
   said gateway assigning said transcoder to said user device in said record, wherein said transcoder is not associated with another user device of said plurality of user devices;
   said user device requesting said streaming content at a first bit rate, of said advertised multiple bit rates, from said gateway;
   said gateway instructing said transcoder to provide said streaming content at said first bit rate requested by said user device, wherein said transcoder provides said streaming content, at said first bit rate requested by said user device, only to said user device;
   said transcoder transcoding said streaming content at said first bit rate requested by said user device;
   said user device requesting said streaming content at a second bit rate, of said advertised multiple bit rates, from said gateway, wherein said second bit rate is different from said first bit rate;
   said gateway instructing said transcoder to provide said streaming content at said second bit rate requested by said user device, wherein said transcoder provides said streaming content, at said second bit rate requested by said user device, only to said user device; and said transcoder transcoding said streaming content at said second bit rate requested by said user device.

2. The method of claim 1, wherein said transcoder is within a media server within said gateway.

3. A system for providing a plurality of bit rates, the system comprising:
   a gateway having a plurality of transcoders and a media server; and
   a plurality of user devices, wherein each of said plurality of user devices is registered to said gateway, wherein a different transcoder from amongst said plurality of transcoders is associated with each of said plurality of user devices in a record comprising details of computing resources and screen capabilities of said plurality of user devices, wherein a transcoder, of said plurality of transcoders, has a single encoder and a single decoder, and wherein said transcoder is configured to adapt streaming content to said plurality of bit rates;
   wherein said gateway is configured to:
   advertise multiple bit rates, of said plurality of bit rates, to a user device of said plurality of user devices registered to said gateway; and
   assign said transcoder to said user device in said record, wherein said transcoder is not associated with another user device of said plurality of user devices;
   wherein said user device is configured to request said streaming content at a first bit rate, of said advertised multiple bit rates, from said gateway;
   wherein said gateway is further configured to instruct said transcoder to provide said streaming content at said first bit rate requested by said user device, wherein said streaming content, at said first bit rate requested by said user device, is provided by said transcoder only to said user device, and wherein said streaming content at said first bit rate requested by said user device is transcoded by said transcoder;
   wherein said user device is further configured to request said streaming content at a second bit rate, of said advertised multiple bit rates, from said gateway, wherein said second bit rate is different from said first bit rate; and wherein said gateway is further configured to instruct said transcoder to provide said streaming content at said second bit rate requested by said user device, wherein said streaming content, at said second bit rate requested by said user device, is provided by said transducer only to said user device, and wherein said streaming content at said second bit rate requested by said user device is transcoded by said transcoder.

4. The system of claim 3, wherein each of said plurality of transcoders includes an associated encoder and decoder pair, and wherein each of said encoder and decoder pair is only associated with one of said plurality of transcoders.

5. The system of claim 3, wherein one of said plurality of user devices requests said streaming content to be delivered to said user device and said another user device at a bit rate provided by said associated transcoder, and wherein said streaming content from said associated transcoder is provided by said media server to said user device and said another user device both at said bit rate.

\* \* \* \* \*